(12) United States Patent
Weng et al.

(10) Patent No.: US 7,101,936 B2
(45) Date of Patent: Sep. 5, 2006

(54) OLEFIN POLYMERIZATION PROCESS TO PRODUCE BRANCHED POLYMER COMPOSITIONS

(75) Inventors: Weiqing Weng, Houston, TX (US); Aspy K. Mehta, Humble, TX (US); Pawan K. Agarwal, Houston, TX (US); Armenag Dekmezian, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 18 days.

(21) Appl. No.: 10/433,264

(22) PCT Filed: Dec. 18, 2001

(86) PCT No.: PCT/US01/48963

§ 371 (c)(1),
(2), (4) Date: Jun. 2, 2003

(87) PCT Pub. No.: WO02/50145

PCT Pub. Date: Jun. 27, 2002

(65) Prior Publication Data

US 2004/0054098 A1 Mar. 18, 2004

Related U.S. Application Data

(60) Provisional application No. 60/257,043, filed on Dec. 20, 2000.

(51) Int. Cl.
*C08L 23/14* (2006.01)
*C08L 23/12* (2006.01)

(52) U.S. Cl. .............. 525/232; 525/240; 525/244; 525/320; 526/336; 526/339; 526/348

(58) Field of Classification Search ............... 526/336, 526/339, 348; 525/232, 240, 244, 320
See application file for complete search history.

(56) References Cited

U.S. PATENT DOCUMENTS

| 3,718,632 | A | | 2/1973 | Gardner et al. .......... 260/80.78 |
| 4,306,041 | A | | 12/1981 | Cozewith et al. ............ 526/65 |
| 5,670,595 | A | | 9/1997 | Meka et al. ................ 526/336 |
| 5,814,714 | A | * | 9/1998 | Palomo et al. .............. 526/336 |

FOREIGN PATENT DOCUMENTS

| WO | WO 98/02471 | 1/1998 |
| WO | WO 99/45046 | 9/1999 |
| WO | WO 99/45049 | 9/1999 |
| WO | WO 00/11057 | 3/2000 |

* cited by examiner

*Primary Examiner*—Roberto Rabago

(57) ABSTRACT

A method of lowering MFR response of a high-melt-flow-rate-polymer-producing metallocene catalyst is provided. The method includes contacting the metallocene catalyst with a sufficient quantity of α,ω-diene monomer such that when the catalyst composition is contacted with polymerizable reactants under suitable polymerization conditions, the resulting polymer has an MFR rate in the range of 0.1 to 1000. Hydrogen and ethylene may also be present in the polymerization. Additionally a catalyst composition is provided which includes a high-melt-flow-rate-polymer-producing metallocene catalyst and a sufficient quantity of α,ω-diene monomers such that when the catalyst composition is contacted with a monomer under polymerization conditions, the resulting polymer has an MFR rate in the range of 0.1 to 1000.

40 Claims, 6 Drawing Sheets

Standard olefin polymerization process:
Homo polymer (frame I), with α,ω–diene (frame II).
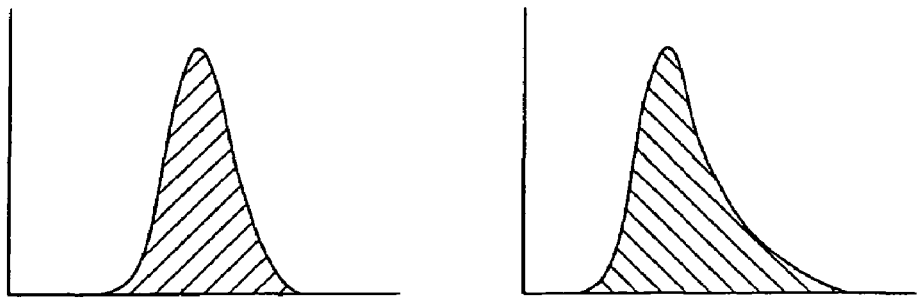
Two-stage olefin polymerization process:
Without and with increased hydrogen during diene
incorporation stage (frames III & IV, respectively).
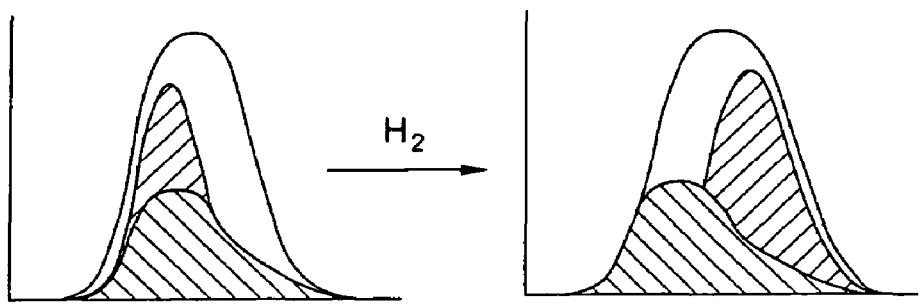
Schematic representations of molecular weight distributions of olefin polymers.
Fig. 1

Figure 2:
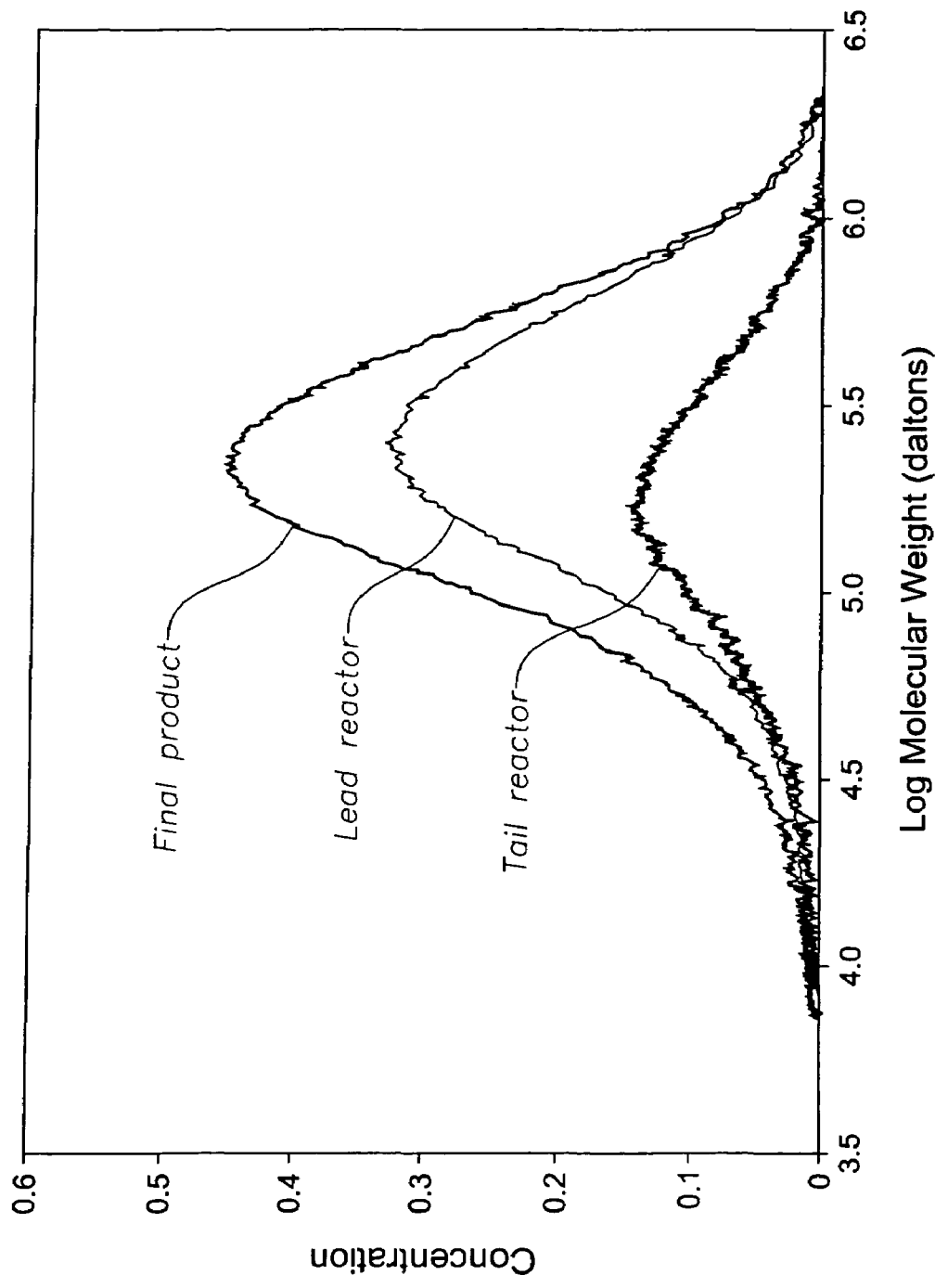

Fig. 2 Molecular weight distributions of lead and tail reactor components of Example 12

Figure 3:
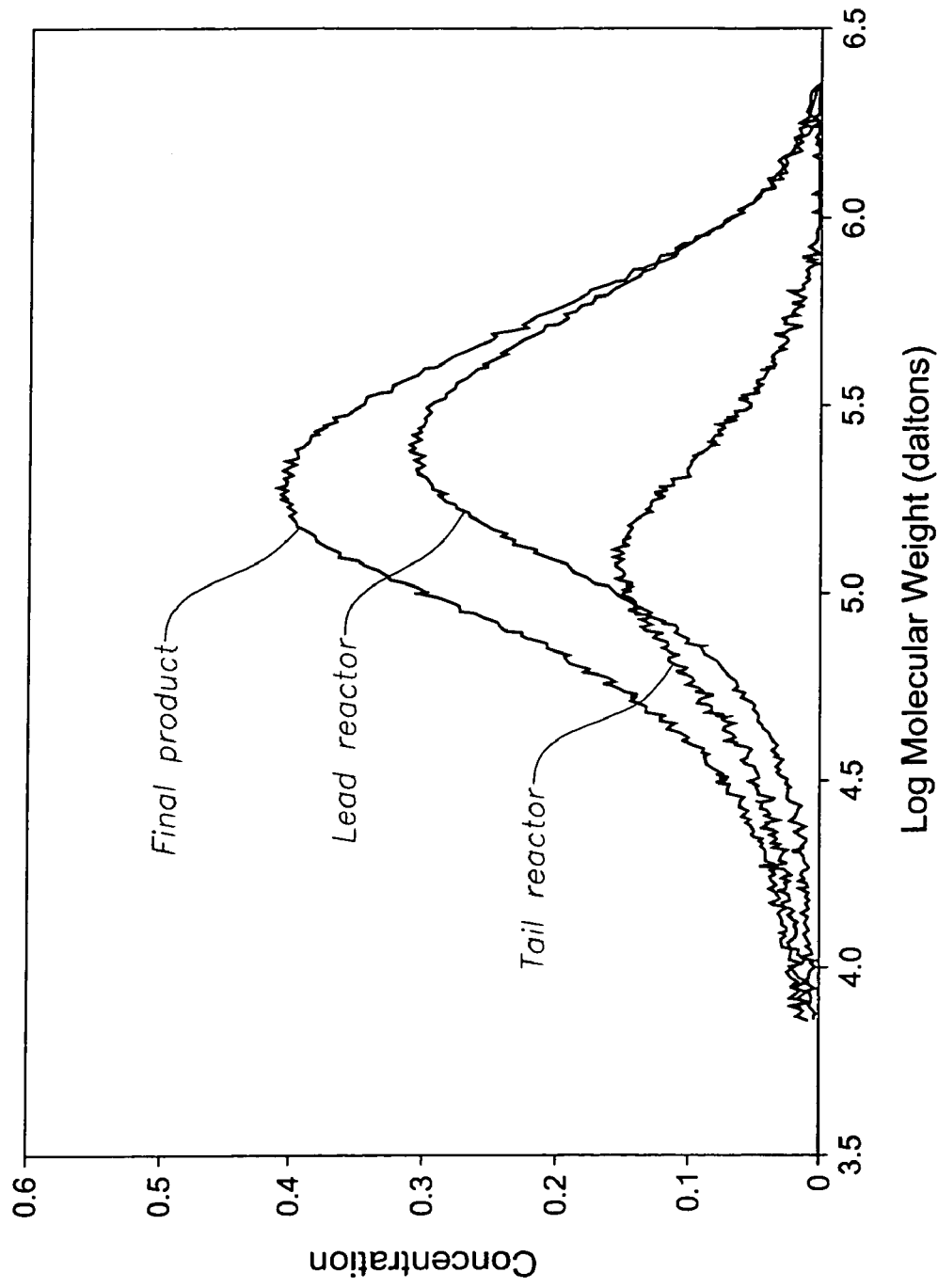

Fig. 3 Molecular weight distributions of lead and tail reactor components of Example 13

Figure 4:
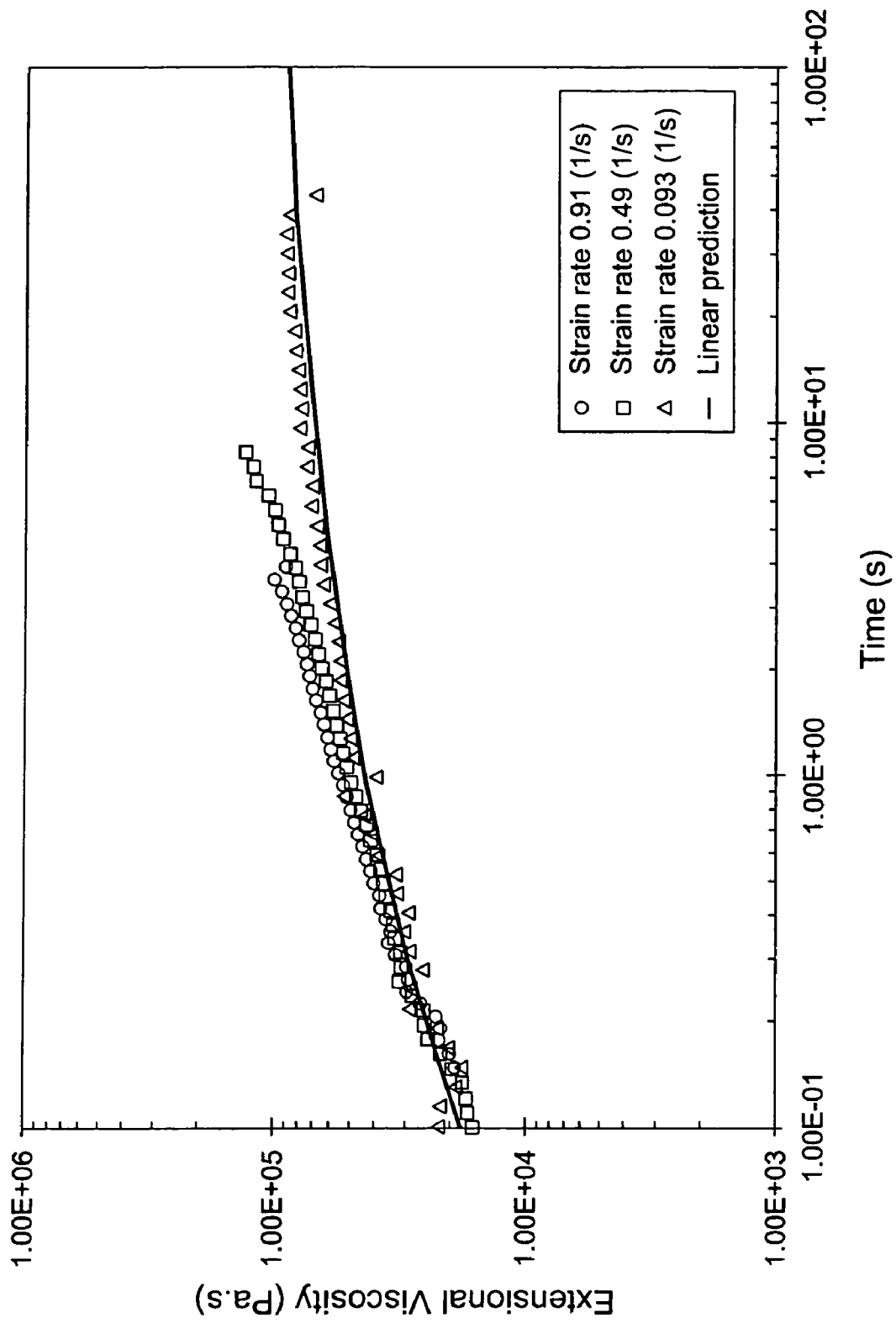

Fig. 4  Extensional Viscosity Growth Curve for Example 11

OLEFIN POLYMERIZATION PROCESS TO PRODUCE BRANCHED POLYMER COMPOSITIONS

CROSS REFERENCE TO RELATED APPLICATIONS

This application clams priority Provisional Aplication No. 60/257,043, filed Dec. 20, 2000.

FIELD

The present invention relates to methods of olefin polymerization. More particularly the invention relates to methods of polymerizing olefins and diene monomers.

BACKGROUND

Polyolefins are used throughout modern society. Some varieties are inexpensive thermoplastic polymers employed in wide varieties of applications, the articles of which include, for example, films, fibers, such as spunbonded and melt blown fibers, fabrics, such as nonwoven fabrics, and molded articles. Polymer selection for any one particular application depends, in part, on the polymer's properties, the fabrication mode or manufacturing process, the final article and its intended uses. Examples of some of these properties include density, molecular weight, molecular weight distribution, melting temperature, melt strength, and melt flow rate.

Polymer properties are generally dependent upon the conditions present during polymerization. One such condition is the catalyst. In some instances, while catalyst selection is an important reaction parameter, changing other variables in the presence of the same catalyst produces different polymer properties. For example, adding hydrogen to a catalyzed polymerization reaction may increase the catalyst activity. Catalyst activity can be measured by the increase or decrease in the amount of polymer produced during a measured time interval by a measured amount of catalyst. Generally, an increase in catalyst activity results in an increase in polymer production. Producing more polymer with the same catalyst amount or using less catalyst to produce the same polymer amount provides a commercial advantage.

There are many instances where hydrogen addition not only increases polymer amount, but also increases polymer melt flow rate (MFR). Many manufacturing processes have specific, if not strict, polymer MFR requirements. For example, High-MFR (low molecular weight) polymers are suitable for nonwoven applications because melting and handling the molten polymer are common steps in converting the polymer into a finished article, while low-MFR (high molecular weight) polymers are required for foaming and thermoforming applications.

In addition to MFR and molecular weight, molecular weight distribution (MWD) is an important polymer property. Similarly, catalyst selection is also an important parameter. For example, conventional multisite catalysts produce polymers with broad MWD, which are easy to process in fabrication, while polymers made with single site catalysts generally have narrow MWD with higher toughness and clarity. Certain catalysts and particularly certain metallocene catalysts are suitable for producing polymers of a particular MFR. Different polymer end uses require different MFR. This frequently means that a polymer manufacturer must change catalysts when targeting a different end use—an expensive and time consuming proposition.

Incorporating $\alpha,\omega$-diene molecules into the polymerization reaction alters the apparent MFR response of a catalyst. Thus, diene incorporation allows a manufacturer to target different polymer end uses while short cutting around the catalyst change.

Incorporating $\alpha,\omega$-dienes in the polymerization process has been used to introduce branching into the polymer, which improves the polymer's melt properties. U.S. Pat. No. 5,670,595 describes diene-modified polymers made with metallocene catalysts. But diene-modified polymers usually contain high molecular weight components due to the chemistry of diene-induced LCB-polymer formation. These components sometimes degrade LCB-polymer properties.

Diene incorporation allows polymer property and catalyst response tuning. But what is needed is a diene-incorporation tool that provides for such tuning while avoiding the runaway crosslinking that degrades diene-modified-polymer properties. Moreover, a straightforward way to select polymer molecular weight distribution without changing catalysts until now, remains unavailable.

For additional background, see also WO 99/45046; WO 99/45049; U.S. Pat. No. 4 306 041 A; WO 98/02471 A; U.S. Pat. No. 3,718,632 A; WO 00/11057A; U.S. Pat. No. 5,670,595 A; WO 99/45046 A; WO 99/45049 A; U.S. Pat. No. 4,306,041 A; WO 98/02471 A; U.S. Pat. No. 3 718 632 A; WO 00/11057 A; and U.S. Pat. No. 5,670,595 A.

SUMMARY

Some of the invention's embodiments provide ways of varying the molecular weight distribution of a polymer blend without changing the catalyst. The invention allows the molecular weight distribution to be adjusted over a wide range using $\alpha,\omega$-diene incorporation. And it allows this control while avoiding the problems that frequently accompany polymerization.

The scope of the embodiments include a polymerization reaction of olefin monomers, such as propylene monomers, with an $\alpha,\omega$-diene in the presence of hydrogen and optionally other comonomer(s), such as ethylene or butene, and the resulting olefin/$\alpha,\omega$-diene polymers. The present invention involves a polymerization reaction between olefin monomers (such as propylene, or ethylene) and $\alpha,\omega$-diene monomers.

Some method embodiments include carrying out multistage, single-catalyst processes that result in in-situ polymer blends. The polymerization conditions chosen for one stage aim at a polymer component with one molecular weight distribution (MWD), while those chosen for a different stage aim at a polymer component with a different MWD, as desired. In other words, one stage produces a polymer component with a particular MWD/MW population and another stage produces a different polymer component with a different MWD/MW population. The different stages allow manipulation of $\alpha,\omega$-diene concentration, gaseous hydrogen content, time, and, to a lesser extent, temperature to engineer the desired MW and MWD of the blend components and the relative amount of each component in the blend. This level of control allows the blend's overall properties to be matched to the properties required of the resin without changing catalyst or using multimodal polymerization processes. Embodiments of this invention not only provide processes with the economic and temporal advantages of a single-catalyst system, but also the flexibility and control over MW and MWD traditionally associated with bi- or multi-modal, in situ blend production.

Copolymerization-Class Embodiments

Some invention embodiments include copolymerization methods having several steps. Some embodiments have a step of supplying the catalyst; a step of conducting a diene-free stage; and a step of conducting a diene-incorporation stage. Typically, the diene-free stage has the steps of supplying an amount of gaseous hydrogen; supplying an amount of olefin monomer or monomers; combining the catalyst, the hydrogen, and the olefin monomers under polymerization conditions. The polymerization conditions are any of those that are known in the art. Invention embodiments include controlling the hydrogen amount, the olefin amount, the reaction pressure, and the reaction temperature in a diene-free stage. The diene-incorporation stage typically comprises the step of supplying an amount of $\alpha,\omega$-diene; supplying an amount of gaseous hydrogen; supplying an amount of olefin monomer; and combining the catalyst, the $\alpha,\omega$-diene, hydrogen, and the olefins under polymerization conditions. Once again, polymerization conditions are those as are known in the art. Some embodiments include controlling the diene amounts, hydrogen amount, olefin amount, reaction pressure, and reaction temperature during the diene-incorporation stage. The polymerization conditions of the diene-free stage typically yield linear polymer; the polymerization conditions of the diene-incorporation stage typically yield branched polymer.

Some invention embodiments use reaction temperatures as low as 0 degrees Celsius or 50 degrees Celsius in either the diene-free stage or the diene-incorporation stage. Some invention embodiments use reaction temperatures as high as 150 degrees Celsius or as high as 80 degrees Celsius in either the diene-free stage or the diene-incorporation stage. Some invention embodiments use reaction pressures as low as 100 psia (0.689 MPA) for either the diene-incorporation stage or the diene-free stage. Some invention embodiments use reaction pressures as high as 700 psia (4.8 MPA) for either the diene-incorporation stage or the diene-free stage. Moreover, some embodiments are operated such that the propylene is supercritical.

Some invention embodiments include olefins that are polymerizable, lower molecular weight olefins, e.g. ethene, propene, 1-butene, 1-pentene, 1-hexene, 1-heptene, 1-octene, 1-nonene, 1-decene, 1-undecene, 1-dodecene, 4-methyl-1-pentene, 3-ethyl-1-hexene, 4-methyl-4-ethyl-1-hexene, 3-ethyl-5-methyl-1-heptene, 3-methyl-1-decene, 3,9-dimethyl-5-butyl-1-decene, or 4-methyl-1-undecene.

Some invention embodiments have minimum olefin(s) composition(s) of 90 weight percent. Some invention embodiments have minimum olefin compositions of 95 weight percent. Some invention embodiments have maximum olefin compositions of 99.999 or 99.997 weight percent. Finally, some inventions have maximum olefin compositions of 99.995 weight percent.

Second or other olefins are optional in the practice of this invention; thus, some invention embodiments have maximum composition of second or other olefins of 0 weight percent. Others have minimum compositions of second or other olefins of 0.005 weight percent. Still others have minimum compositions of second or other olefins of 0.001 weight percent. Some invention embodiments have maximum compositions of second or other olefins of 3 weight percent; others have maximum compositions of second or other olefins of 8 weight percent.

Some invention embodiments employ $\alpha,\omega$-dienes that are linear, branched, cyclic, aliphatic, or aromatic molecules with olefinically-unsaturated first and second terminal parts. Some invention embodiments employ $\alpha,\omega$-dienes selected from 1,4-pentadiene, 1,5-hexadiene, 1,6-heptadiene, 1,7-octadiene, 1,8-nonadiene, 1,9-decadiene, 1,10-undecadiene, 1,11-undecadiene, 1,12-dodecadiene, 3,4-dimethyl-1,6-heptadiene, 4-ethyl-1,7-octadiene, and 3-methyl-5-propyl-1,10-undecadiene.

Some invention embodiments have stages in which the maximum amount of $\alpha,\omega$-diene is up to 2.0 weight percent; others have stages in which the maximum amount of $\alpha,\omega$-dienes is up to 0.5 weight percent; yet others have maximum $\alpha,\omega$-diene amount of up to 0.05 weight percent. Some invention embodiments have minimum $\alpha,\omega$-diene amounts of 0.001 weight percent or greater; others have stages in which the minimum $\alpha,\omega$-diene amount is 0.003 weight percent or greater; yet others have minimum $\alpha,\omega$-diene amounts of 0.005 weight percent or greater.

Some invention embodiments have stages in which the maximum concentration of hydrogen gas is up to 50,000 ppm; others have stages in which the maximum concentration of hydrogen gas is up to 20,000 ppm; yet others have stages in which the maximum concentration of hydrogen gas is up to 10,000 ppm. Some embodiments have stages in which hydrogen gas is optional and thus have hydrogen concentrations as low as 0 ppm. Moreover, some embodiments have stages in which the minimum concentration of hydrogen gas is as low as 100 ppm; others have minimum hydrogen concentrations that go as low as 500 ppm. Some embodiments have stages which the minimum concentration of hydrogen gas goes as low as 1000 ppm.

Invention embodiments can be run in single, series, or parallel reactors. Some invention embodiments are similar to the polymer produced by the methods described above; others are constructed out of polymers produced by the methods described above. For example, useful invention embodiments comprise film, fiber, fabric, and molded articles produced using polymers similar to those described above.

Finally, some invention embodiments produce in situ blends of linear and branched polyolefins using a single olefin catalyst.

BRIEF DRAWING DESCRIPTION

FIG. 1 (frames I–IV.): Schematic representation of several molecular weight distributions for olefin polymers.

FIG. 2: Molecular weight distributions of lead and tail reactor components of Example 12.

FIG. 3: Molecular weight distributions of lead and tail reactor components of Example 13.

FIG. 4: Extensional Viscosity Growth Curve for Example 11.

Figure 5:
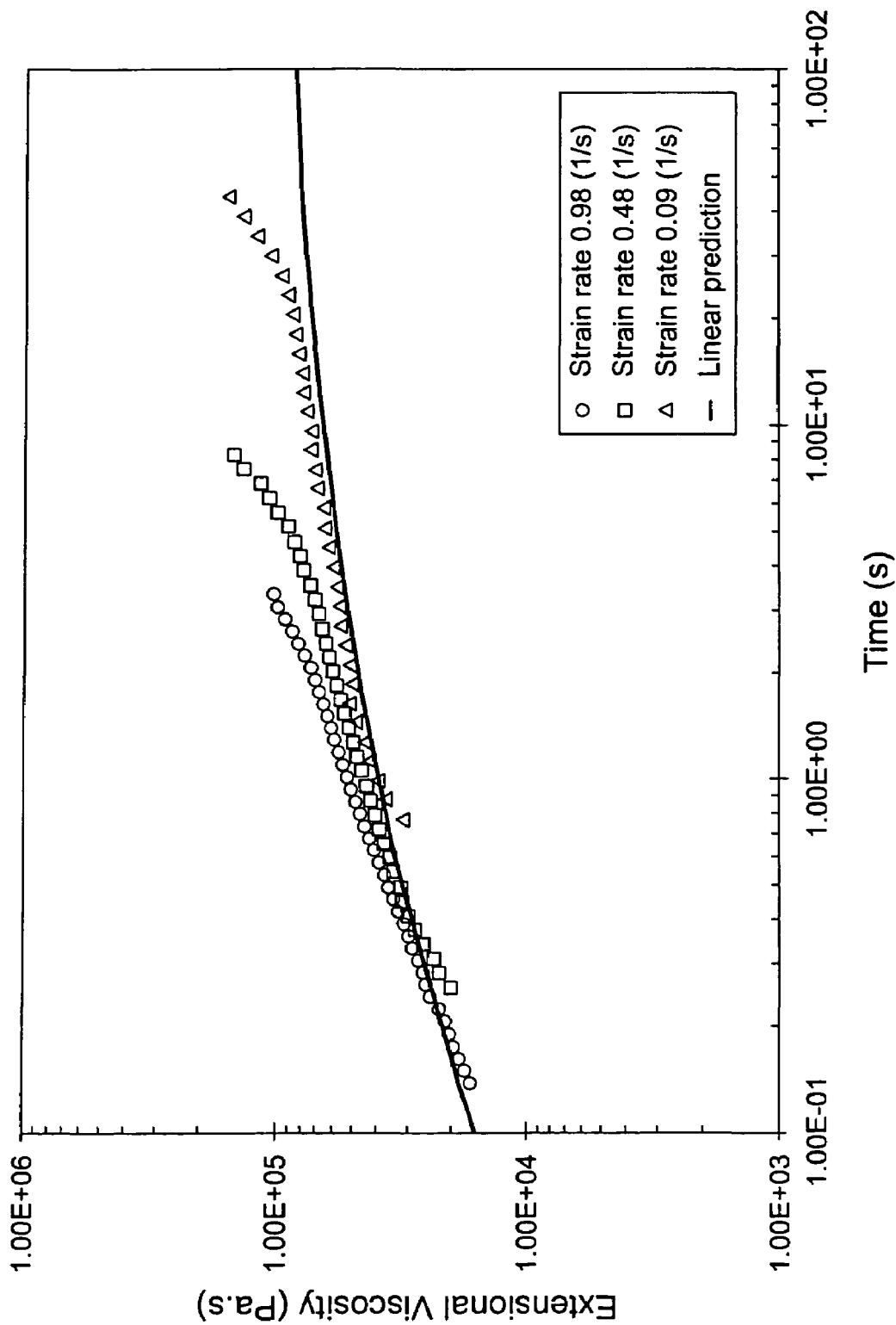

FIG. 5: Extensional Viscosity Growth Curve for Example 12.

Figure 6:
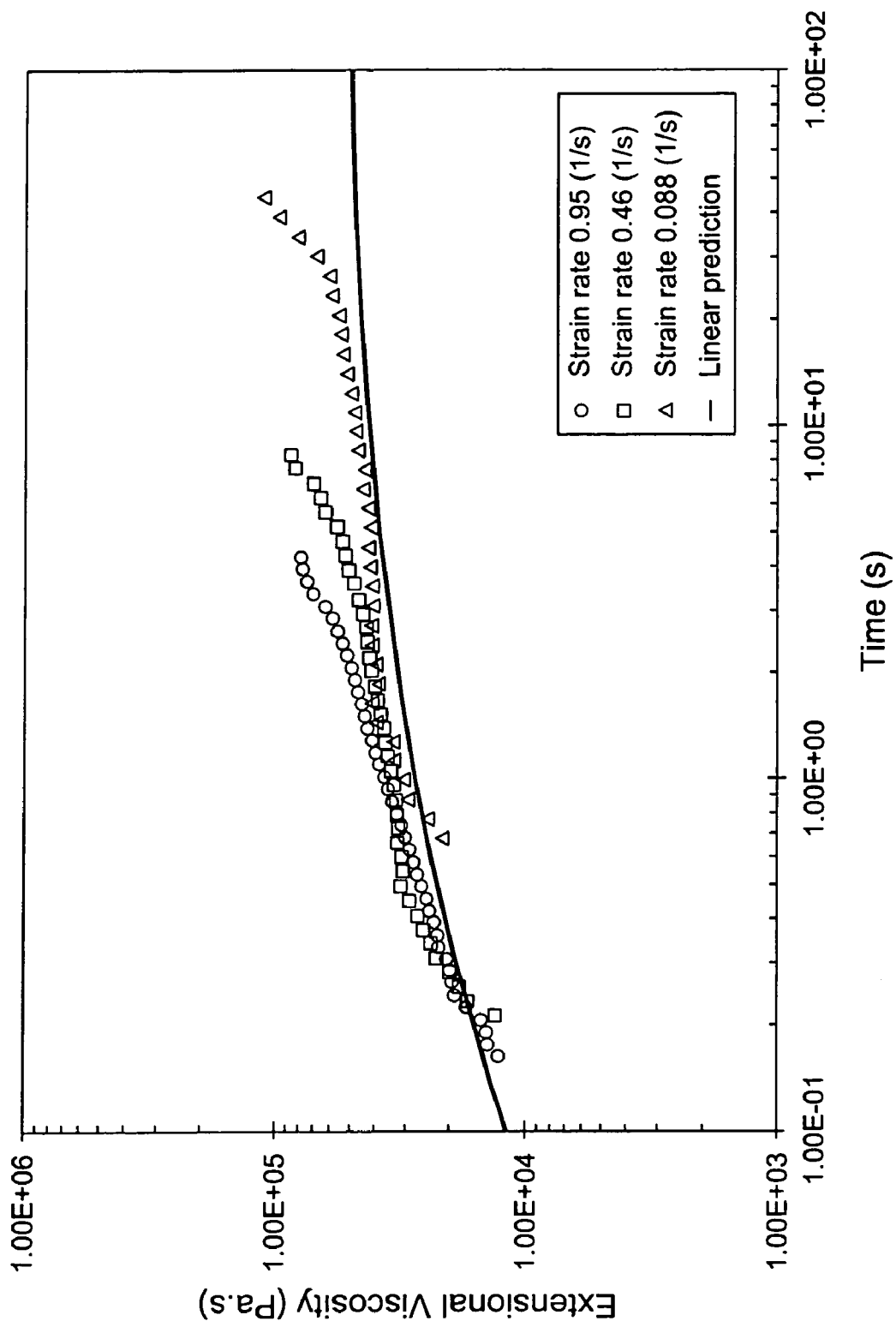

FIG. 6: Extensional Viscosity Growth Curve for Example 13.

DEFINITIONS

'Gelation' is a situation in which a polymer product or portions of the polymer product contain enough crosslinking so that an intractable solid or gel forms.

'Diene-free' is used to denote process steps or conditions in which no $\alpha,\omega$-diene is purposely added to the reaction. But because the reaction components in the polymerization reaction contain impurities, small amounts of extraneous α,ω-diene may, in fact, be present in a process that is referred to as 'diene-free.'

'Polymer' encompasses the traditional art-recognized definition. It includes homopolymers and heteropolymers such as copolymers. Unless otherwise stated, a reference to 'polymer' is meant to cover all varieties of copolymer.

"Copolymer" encompasses the traditional art-recognized definition. Periodically, throughout this disclosure, and particularly when describing the constituents of the polymer, monomer terminology may be used. For example, terms such as "olefin", "propylene", "α,ω-diene", "ethylene" and other α-olefins names, are used with the understanding that such monomer terminology applied to polymer constituents means that the polymer contains the product of polymerizing that type of monomer. For example, a propylene polymer is a polymer having instances of connected carbon atoms that were previously connected to each other in a propylene molecule. It does not mean that propylene is present in the polymer.

Recited parameter ranges are used throughout the specification. These ranges include the recited end-point values as well as those values defined by or between the recited end points. Naming a specific value for a range is not intended to exclude equivalent ranges. And a range at least encompasses values outside of the recited range, but within that particular measurement method's error margin. Ranges also extend at least to values that are not statistically different from those recited. Furthermore, the ranges extend past the recited end points to include all values that are known or found to be functionally equivalent to a value within the recited range.

The term "branched" means one or more α,ω-diene linkages, desirably at the α,ω positions of the diene unit, between two or more polymer chains formed by polymerizing one or more α-olefins. A branched polymer means a polymer such as diene linkages. Branched polymers encompass pure branched polymer and mixtures of branched and linear polymers.

DETAILED DESCRIPTION

The broadest description of this invention has a large scope. Embodiments of this invention are suitable for use in any polymerization method in which α,ω-diene content alters the MWD of the resulting polymer. Embodiments of the invention in part provide a method of producing a multimodal, in-situ polymer blend. This blend has at least one branched polymer component and one linear polymer component or at least two different branched polymer components, but it can be produced with a single catalyst. Modification of α,ω-diene content and hydrogen gas content between one stage and another allows the single catalyst to function like a multimodal system. (One of ordinary skill in the art will recognize that the invention process is not conceptually limited to a single catalyst. For instance, if two catalysts were used in an invention method with two stages, the resulting blend would contain up to four different polymer types with up to four different MWs and MWDs).

In some embodiments, multiple stages are run in which the reaction parameters are selected so that higher molecular weight polymers are made by the catalyst in one stage and lower molecular weight polymers are made in another, giving a blend with two polymer components.

The hydrogen or diene content of the separate stages can have discrete values. Or, when going from one set of conditions to another, the hydrogen or diene content can be ramped so that the change from one stage to the next is gradual. The stage-to-stage condition changes can also be accomplished using a combination of discrete, abrupt changes, and ramped, gradual changes, as desired.

This invention will function as long as the polymer MWD changes when α,ω-diene content changes during polymerization.

The first frame of FIG. 1 shows the MWD of a standard olefin polymerization. The overall MWD for each is shown as a dashed line. The second frame shows a standard olefin polymerization with added α,ω-diene that increases polymer branching. It shows the high-molecular-weight tail that accompanies olefin polymerization with α,ω-dienes. This tail comes from linkages between long chain polymers. If the number of linkages becomes too great, gelation occurs, rendering the polymer useless. The third frame shows a two-stage reaction process. In one stage, polymerization occurs without added diene; in the other, polymerization occurs with added diene. The overall MWD of the polymer is a combination of each stage's individual MWD. The third frame also shows the tail discussed above. The fourth frame shows one embodiment of the current invention. In it, hydrogen is added during the diene-incorporation phase. The hydrogen favors lower molecular weight polymer, and shifts the molecular weight of the diene-incorporated polymer to a lower overall MWD. The tailing still occurs, but it is shifted to lower molecular weights; it ceases to present a problem.

Thus, one practicing this invention can tune the MWD as desired. The ratio of non-branched to branched polymer can be varied by varying the reaction time in the non-branching regime versus the reaction time in the branching regime. The molecular weight distribution of the non-branched polymer versus the branched polymer can be modified by modifying the amount of hydrogen present in each regime. Also, reaction temperature provides a smaller measure of control over the MWDs. In each case, this control is exercised without changing the catalyst. Moreover, the invention is well suited for multistage polymerization control. Some embodiments conduct the non-branched stage before the branched stage. Other embodiments conduct the branched stage before the unbranched.

The olefin/α,ω-diene polymer, includes a polymerization reaction product, and for instance a metallocene polymerization reaction product of one or more olefin monomers. In some embodiments, the polymer includes a polymerization reaction product of propylene and ethylene monomers with one or more species of α,ω-diene monomers.

Methods

Some embodiments of the methods described in this specification produced olefin α,ω-diene polymers—some with lower MFRs or increased molecular weights in comparison to olefin polymers prepared under similar conditions absent α,ω-diene. This is achieved by lowering the MFR response of a high-melt-flow-rate-polymer-producing catalyst. As such, these methods, and particularly diene incorporation during polymerization, expand the MFR response spectrum of such a catalyst. By expanding the catalyst's MFR response spectrum, the polymer manufacturer may employ the same catalyst in meeting both high- and low-MFR product specifications. In this way, costly catalyst switching is avoided.

The broad tool provided by the invention methods can be used flexibly, in a variety of operating modes. For example, some embodiments feature a two-stage polymerization process. Many permutations of stage conditions are available in a two-stage invention embodiment; several are shown below, see Table 1. These are provided as examples.

TABLE 1

Exemplary Invention Embodiments Having Two Stages

| Stage-1 diene | Stage-1 H$_2$ | Stage-2 diene | Stage-2 H$_2$ |
|---|---|---|---|
| None | Low | High | High |
| None | High | High | High |
| None | Low | Moderate | High |
| None | Moderate | Low | Moderate |
| None | Moderate | High | High |
| None | Low | Low | Low |
| Low | None | High | High |
| Low | Low | Low | High |
| Low | Moderate | High | Moderate |
| High | Low | None | Low |

In Table 1, several examples of the invention methods are shown.

Stage-1 diene refers to the amount of intentionally added diene, likewise for Stage-2 diene. For these diene columns, in weight % based on the total reactant mass columns, high means greater than 0.3 wt % and less than or equal to 2 wt %; moderate means greater than 0.005 wt % and less than or equal to 0.3 wt %; and low means greater than 0 wt % and less than or equal to 0.005 wt %. Stage-1H$_2$ and Stage-2H$_2$ refer to the amount of hydrogen gas added to each of the reactor stages, in ppm. High means greater than 10,000 ppm and less than or equal to 50,000 ppm. Moderate means greater than 1,000 ppm and less than or equal to 10,000 ppm; and low means greater than 0 ppm and less than or equal to 1,000 ppm. None for all entries means that no diene or hydrogen gas (respectively) is purposely added to the stage in question. Below, the table's first row is interpreted. The embodiment of row one has no diene in stage one (a diene-free stage), and the hydrogen gas is supplied at a low level (i.e. greater than 0 ppm and less than or equal to 1,000 ppm). In stage two, the amount of diene is high (a diene-incorporation stage), and the hydrogen gas is supplied at a high level. The embodiment shown in the table could be practiced in a one or more vessel batch reactor or in a one or more vessel sequential reactor, for example. Moreover, the invention extends further to operating modes that have more than two polymerization stages. In fact, any combination of number and nature of reaction stages is considered within the scope of this invention as long as the combination contains at least one diene-incorporation stage plus one other stage that is either a diene-free or a diene-incorporation stage.

Some embodiments provide propylene polymer having a MFR of 0.1 to 1,000. The first polymerization stage can include contacting a high-melt-flow-rate-polymer-producing catalyst under suitable polymerization conditions with polymerizable reactants, such as propylene monomers, and α,ω-diene monomers and recovering the propylene polymer. In some embodiments the catalyst is a metallocene. In some embodiments the metallocene catalyst is a zirconium metallocene catalyst. Additionally, any stage may include hydrogen and a second (or third, etc.) type of monomer. Other embodiments have added α,ω-diene in more than one stage. In some embodiments, the second stage is run under different polymerization conditions chosen to favor lower-molecular-weight polymer. In some embodiments, the first stage is run for a time. After that, the reaction conditions are changed, and the second stage is run for a time. The second stage includes contacting a high-melt-flow-rate-polymer-producing catalyst under suitable polymerization conditions with polymerizable reactants, such as propylene monomers, and α,ω-diene monomers and recovering the propylene polymer.

Exemplary reaction conditions using methods of this invention are set out below. Hydrogen (in parts per million (ppm)) is measured as the gas phase concentration in equilibrium with liquid monomer at the polymerization temperature. See Table 2. Useful minimum hydrogen content is 100, 500, or 1000 ppm; useful maximum hydrogen content is 10,000, 20,000, or 50,000 ppm. It should be appreciated that ranges formed by any combination of these limits are within the scope of this invention. In other words, hydrogen content can take any of the following ranges: 100–10,000; 100–20,000; 100–50,000; 500–10,000; 500–20,000; 500–50,000; 1,000–10,000; 1,000–20,000; and 1,000–50,000 ppm.

TABLE 2

Exemplary Hydrogen content

| Embodiment | Hydrogen content, PPM |
|---|---|
| A | ≦20,000 |
| B | ≦50,000 |
| C | ≦10,000 |
| D | ≧1000 |
| E | ≧500 |
| F | ≧100 |

α,ω-diene is measured in wt %, as shown in Table 3. Useful minimum diene content for the diene-incorporation stage is 0.001, 0.003, or 0.005 weight percent. Useful maximum α,ω-diene content for the diene-incorporation stage is 2.0, 0.5, or 0.05 weight percent. The diene-free stage typically has no added α,ω-diene. It should be appreciated that ranges formed by any combination of these limits are within the scope of this invention. In other words, α,ω-diene content can fall within any of the following ranges: 0.001–0.05; 0.001–0.5; 0.001–2.0; 0.003–0.05; 0.003–0.5; 0.003–2.0; 0.005–0.05; 0.005–0.5; and 0.005–2.0 wt %.

TABLE 3

Exemplary α,ω-diene content

| | α,ω-diene content | |
|---|---|---|
| Embodiment | Weight Percent | PPM |
| G | ≧0.001 | ≧10 |
| H | ≦2 | ≦20,000 |
| I | ≧0.003 | ≧30 |
| J | ≦0.5 | ≦5,000 |
| K | ≧0.005 | ≧50 |
| L | ≦0.05 | ≦500 |

The total weight of polymerizable reactants is also measured in weight %. See Table 4. Useful minimum total polymerizable reactant weight is 90 and 95 weight percent. Useful maximum total polymerizable reactant weight is 99.997, 99.995, or 99.999 weight percent. It should be appreciated that ranges formed by any combination of these limits are within the scope of this invention. This means that the total weight of polymerizable reactants fall within the following ranges: 90–99.995; 90–99.997; 90–99.999; 95–99.995; 95–99.997; and 95–99.999.

TABLE 4

Exemplary total, polymerizable reactant content, in weight percent.

| Embodiment | Olefin monomer(s) content, weight % |
|---|---|
| S | ≤99.999 |
| T | ≤99.997 |
| U | ≥95 |
| V | ≥90 |
| X | ≤99.995 |

Additionally, methods for lowering the MFR response of a high-melt-flow-rate-polymer-producing catalyst are disclosed. For example, this catalyst is one which in a liquefied propylene environment, no hydrogen and typical bulk slurry reactor operating conditions produces polymer with an MFR≧20. The methods include the steps of contacting the catalyst with a sufficient quantity of α,ω-diene monomer such that when the catalyst composition is contacted with polymerizable reactants under suitable polymerization conditions, the resulting polymer has an MFR rate in the range of 0.1 to 1000.

Additionally, a catalyst composition is provided that includes a high-melt-flow-rate-polymer-producing catalyst and a sufficient quantity of α,ω-diene monomers such that when the catalyst composition is contacted with a monomer under suitable polymerization conditions, the resulting polymer has an MFR rate in the range of 0.1 to 1000.

Polymerization

The polymer, which is the polymerization reaction product of α,ω-diene and olefin(s), may be prepared by slurry polymerization of the olefins and diene under conditions in which the catalyst site remains relatively insoluble or immobile so that the polymer chains are rapidly immobilized following their formation. Such immobilization is achieved, for example, by (1) using a solid, insoluble catalyst, (2) conducting the polymerization in a medium in which the resulting polymer is generally insoluble, and (3) maintaining the polymerization reactants and products below the polymer's crystalline melting point.

Generally, the catalyst compositions described below, and in greater detail in the Examples, are suitable for polymerizing α,ω-dienes and olefin (s). Polymerization processes suitable for polymerizing α,ω-dienes and olefins, and particularly ethylene and α-olefins, are well known by those skilled in the art and include solution polymerization, slurry polymerization, and low-pressure, gas-phase polymerization. Metallocene-supported catalyst compositions are particularly useful in the known operating modes employing fixed-bed, moving-bed, fluid-bed, or slurry processes conducted in single, series or parallel reactors.

Generally, any of the above polymerization processes may be used. When propylene is the selected olefin, a common propylene polymerization process is one that is conducted using a slurry process in which the polymerization medium can be either a liquid monomer, like propylene, or a hydrocarbon solvent or diluent; advantageously, an aliphatic paraffin such as propane, isobutane, hexane, heptane, cyclohexane, etc. or an aromatic diluent such as toluene is used as the polymerization medium. Polymerization temperatures can have the values shown in Table 5. It should be appreciated that ranges formed by any combination of these limits are within the scope of this invention. This means that invention embodiments can be now within the following reaction temperature ranges: 0–80, 0–100, 0–150, 30–80, 30–100, 30–150, 50–80, 50–100, and 50–150° C.

TABLE 5

Exemplary reaction temperatures, in ° C.

| Embodiment | Reaction Temperature, ° C. |
|---|---|
| Y | ≤150 |
| Z | ≤100 |
| AA | ≤80 |
| AB | ≥50 |
| AC | ≥30 |
| AD | ≥0 |

Minimum pressures are around 100 psia. Maximum pressures range from 100 to 700 psia (0.69–4.8 MPa). Additional description is given in U.S. Pat. Nos. 5,274,056 and 4,182,810 and WO 94/21962.

Pre-polymerization may also be used for further control of polymer particle morphology in typical slurry or gas phase reaction processes in accordance with conventional teachings. For example, this control can be accomplished by pre-polymerizing ethylene or a $C_3$–$C_6$ α-olefin, or polymerizing ethylene or a $C_3$–$C_6$ α-olefins and suitable α,ω-dienes, for a limited time. For example, ethylene may be contacted with the supported catalyst composition at a temperature of −15 to 30° C. and ethylene pressure of up to about 250 psig (1724 kPa) for 75 min. to obtain a polyethylene coated, supported catalyst composition. The pre-polymerized catalyst is then available for use in the polymerization processes referred to above. In a similar manner, the activated catalyst on a polymer-coated support can be used in these processes.

Additionally, polymerization poisons should be excluded from the reaction vessel to the extent that that is possible. For example, monomer feed streams or the reaction diluent may be treated or pre-treated with a suitable scavenging agent in situ during polymerization. Typically, scavenging agents are organometallic compounds employed in processes such as those using Group-13 organometallic compounds described in U.S. Pat. No. 5,153,157 and WO-A-91/09882 and WO-A-94/03506, noted above, and that of WO-A-93/14132.

Polymerizable Reactants

Suitable polymerizable reactants include ethylene, $C_3$–$C_{10}$ α-olefins or diolefins. Suitable diolefins should have at least one internal olefin. Examples of α-olefins include propylene, 1-butene, 1-pentene, 1-hexene, 1-heptene, 4-methyl-1-pentene, 4-methyl-1-hexene, 5-methyl-1-hexene, 1-octene, 1-decene, 1-undecene, 1-dodecene, etc. In addition, mixtures of these and other α-olefins may also be used, such as, for example, propylene and ethylene as well as monomer combinations from which elastomers are formed. Ethylene, propylene, styrene and butene-I from which crystallizable polyolefins may be formed are particularly useful.

Dienes Examples of suitable α,ω-diene species include α,ω-dienes that contain at least 7 carbon atoms and have up to about 30 carbon atoms, more suitable are α,ω-dienes that contain from 8 to 12 carbon atoms. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Of these, 1,7-octadiene, and 1,9-decadiene are more desirable; particularly desirable is 1,9-decadiene. Branched α,ω-dienes are also suitable: 3,4-dimethyl-1,6-heptadiene, 4-ethyl-1,7-octadiene, or 3-ethyl-4-methyl-5-propyl-1,10-undecadiene. Additionally, α,ω-dienes containing aliphatic, cyclic or aromatic substituents may also be used. α,ω-dienes encompass a broad class of compounds. A key feature for an α,ω-diene of an invention embodiment of this invention is having proximal and distal, terminal alkene unsaturation. Some esoteric examples of α,ω-diene considered to be within the scope of this invention include

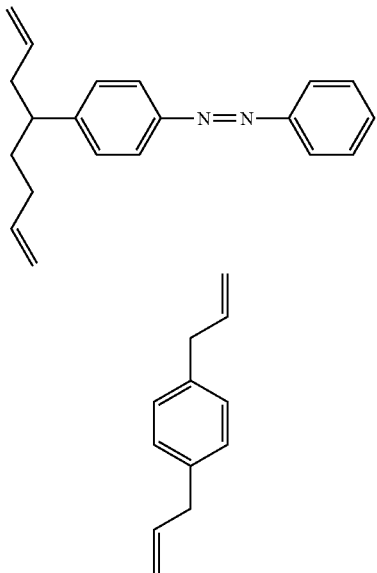

The diene content can be estimated, for example, by measuring absorbence at 722 cm$^{-1}$ using infrared spectroscopy.

Catalyst System

Metallocenes

As used "metallocene" and "metallocene component" refer generally to compounds represented by the formula $Cp_mMR_nX_q$ in which Cp is a cyclopentadienyl ring or derivative that may be substituted, M is a Group 4, 5, or 6 transition metal, for example titanium, zirconium, hafnium, vanadium, niobium, tantalum, chromium, molybdenum and tungsten, R is an unsubstituted or substituted, saturated or unsaturated, hydrocarbyl or hydrocarboxy group having from 1 to 20 carbon atoms, X is a halogen, and m=1-3, n=0-3, q=0-3, and the sum of m+n+q is equal to the oxidation state of the transition metal. Examples of Cp include, but are not limited to:

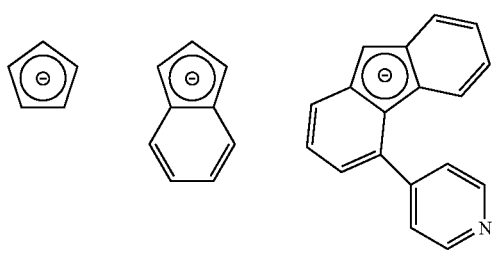

Methods for making and using metallocenes are known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790.

Methods for preparing metallocenes are also described in the *Journal of Organometallic Chem.*, volume 288, (1985), pages 63–67, and in EP-A-320762.

Metallocene catalyst components are described in detail in U.S. Pat. Nos. 5,145,819; 5,243,001; 5,239,022; 5,329,033; 5,296,434; 5,276,208; 5,672,668; 5,304,614; 5,374,752; 5,240,217; 5,510,502 and 5,643,847; and EP 549 900 and 576 970.

Illustrative but non-limiting examples of desirable metallocenes include: Dimethylsilanylbis(2-methyl-4-phenyl-1-indenyl)ZrCl$_2$; dimethylsilanylbis(2-methyl-4,6-diisopropylindenyl)ZrCl$_2$; dimethylsilanylbis(2-ethyl-4-phenyl-1-indenyl)ZrCl$_2$; dimethylsilanylbis(2-ethyl-4-naphthyl-1-indenyl)ZrCl$_2$; phenyl(methyl)silanylbis(2-methyl-4-phenyl-1-indenyl)ZrCl$_2$; dimethylsilanylbis(2-methyl-4-(1-naphthyl)-1-indenyl)ZrCl$_2$; dimethylsilanylbis(2-methyl-4-(2-naphthyl)-1-indenyl)ZrCl$_2$; dimethylsilanylbis(2-methyl-indenyl)ZrCl$_2$; dimethylsilanylbis(2-methyl-4,5-diisopropyl-1-indenyl)ZrCl$_2$; dimethylsilanylbis(2,4,6-trimethyl-1-indenyl)ZrCl$_2$; phenyl(methyl)silanylbis(2-methyl-4,6-diisopropyl-1-indenyl)ZrCl$_2$; 1,2-ethandiylbis(2-methyl-4,6-diisopropyl-1-indenyl)ZrCl$_2$; 1,2-butandiylbis(2-methyl-4,6-diisopropyl-1-indenyl)ZrCl$_2$; dimethylsilanylbis(2-methyl-4-ethyl-1-indenyl)ZrCl$_2$; dimethylsilanylbis(2-methyl-4-isopropyl-1-indenyl)ZrCl$_2$; dimethylsilanylbis(2-methyl-4-t-butyl-1-indenyl)ZrCl$_2$; phenyl(methyl)silanylbis(2-methyl-4-isopropyl-1-indenyl)ZrCl$_2$; dimethylsilanylbis(2-ethyl-4-methyl-1-indenyl)ZrCl$_2$; dimethylsilanylbis(2,4-dimethyl-1-indenyl)ZrCl$_2$; dimethylsilanylbis(2-methyl-4-ethyl-1-indenyl)ZrCl$_2$; dimethylsilanylbis(2-methyl-1-indenyl)ZrCl$_2$.

Generally, these metallocenes' racemic isomers are used to produce stereo-specific polymers, such as isotactic polypropylene. But mixtures of meso and racemic metallocenes may be used to produce polypropylene blends that include amorphous and crystalline components that are useful as thermoplastic elastomers and adhesive compositions. In these instances, the blend's amorphous species may have lower molecular weight than the blends crystalline species. In some elastomer or adhesive applications, these lower-molecular-weight species may not be desired. But when such mixtures are used to polymerize propylene in the presence of one or more of the α,ω-dienes described above, the amorphous component's molecular weigh should increase, thus reducing the presence of undesirable lower molecular weight species in the amorphous component. In these instances, propylene may also be polymerized with ethylene and other α-olefins, such as those described above.

Activators

Metallocenes are generally used in combination with an activator, for example alkylalumoxanes such as methylalumoxane (MAO). There are a variety of alumoxane preparations, methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO94/10180. Activators may also include those comprising or formable into non-coordinating anions during catalyst activation of the catalyst. Compounds or complexes of fluoro-aryl-substituted boron and aluminum are particularly suitable, see, e.g., U.S. Pat. Nos. 5,198,401; 5,278,119; and 5,643,847.

Support Materials

The catalyst compositions used in the process of this invention may optionally be supported using porous particulate materials, such as for example, clays, talcs, inorganic oxides, inorganic chlorides, and resinous materials such as polyolefin or polymeric compounds.

Typically, the support materials are porous inorganic oxide materials including those from Groups-2, -3, -4, -5, -13 or -14 metal oxides. Silica, alumina, silica-alumina, and their mixtures are particularly desirable. Other inorganic oxides that may be employed either alone or in combination with the silica, alumina, or silica-alumina are magnesia, titania, zirconia, etc. Desirable supports for this invention include talc, clay, silica, alumina, magnesia, zirconia, iron oxides, boria, calcium oxide, zinc oxide, barium oxide, thoria, aluminum phosphate gel, polyvinylchloride and substituted polystyrene and appropriate mixtures, such as silica-alumina, zirconia-barium oxide, or polyvinylchloride-polystyrene.

A particularly useful support material is particulate silicon dioxide. Particulate silicon dioxide materials are well known and are commercially widely available. Useful minimum surface areas per silicon dioxide support materials in m$^2$/g, include 50 or greater, 10 or greater, or 100 or greater. Useful maximum surface areas of silicon dioxide support materials include 700 or less, 500 or less, or 400 or less m$^2$/g. Useful minimum pore volume for silicon dioxide support materials include, in cc/g, 0.1 or greater, 0.5 or greater, or 0.8 or greater. Useful maximum pore volumes for silicon dioxide support materials include 3.0 or less, 3.5 or less, or 4.0 or less. Useful minimum average particle diameter for silicon dioxide support materials, in microns include 10 or greater, 15 or greater, or 20 or greater. Useful maximum average particle diameter for silicon dioxide support materials include 100 or less, 150 or less, or 500 or less. Maximum average pore diameters for silicon dioxide support materials, in angstroms, include 350 or less, 500 or less, or 1000 or less. Minimum average pore diameters for silicon dioxide support materials include 10 or greater, 50 or greater, or 75 or greater.

The supported catalyst composition may be used directly in polymerization or the catalyst composition may be pre-polymerized using methods well known in the art. For details regarding prepolymerization, see U.S. Pat. Nos. 4,923,833; 4,921,825; and 5,643,847; and EP 279 863 and EP 354 893.

Modifiers and Additives

Modifiers and additives may be those commonly employed with plastics. Examples include one or more of the following: heat stabilizers, antioxidants, neutralizers, slip agents, antiblock agents, pigments, antifogging agents, antistatic agents, clarifiers, nucleating agents, ultraviolet absorbers, light stabilizers, fillers, hydrocarbon resins, rosins or rosin esters, waxes, additional plasticizers, and other additives in conventional amounts. Effective levels are known in the art and depend on the base polymers, the fabrication mode, and the end application. In addition, hydrogenated or petroleum hydrocarbon resins and other plasticizers may be used as modifiers.

Polymer Embodiments

In some embodiments, the polymerized olefin units are present in the polymer at 90 or greater wt % of the polymer. In some embodiments the polymerized olefin units are present at 99.99 or less wt % of the polymer. Useful, maximum polymerized α,ω-diene unit content in some polymer embodiments is 2 or less weight percent, 1.5 or less weight percent, or one or less weight percent diene. Useful, minimum polymerized α,ω-diene unit content in some polymer embodiments is 0.001 or greater or 0.005 or greater.

In some embodiments, the polymer is made up of mer units from two or more olefins, one of which is propylene. Exemplary propylene content in some of those embodiments is shown in Table 6. It should be appreciated that ranges formed by any combination of these limits are within the scope of this invention. Thus, for some embodiments, propylene content ranges from 90–99.999 wt %.

TABLE 6

Exemplary propylene content in some polymer embodiments, in weight percent.

| Embodiment | Propylene unit content, wt % |
|---|---|
| BT | ≦99.999 |
| BU | ≧90.05 |

Exemplary comonomer content for some embodiments is shown in Table 7.

TABLE 7

Exemplary comonomer content in some polymer embodiments, in weight percent.

| Embodiment | Comonomer unit content, wt % |
|---|---|
| BV | ≦6 |
| BW | ≦8 |
| BX | ≦3 |
| BZ | ≧0.5 |

Exemplary polymer embodiments that fall within the scope of this invention are shown in Table 8. It should be appreciated that ranges formed by any combination of these limits are within the scope of this invention. Thus, some useful invention embodiments have a comonomer content of: 0.5–3; 0.5–6; 0.5–8 wt %.

TABLE 8

Exemplary polymer embodiments

| Embodiment | propylene content, wt % | Comonomer content, wt % | α,ω-diene content, wt % |
|---|---|---|---|
| ZA | 99.99 | 0.00 | 0.01 |
| ZB | 99.60 | 0.30 | 0.01 |
| ZC | 90.40 | 7.00 | 2.00 |
| ZD | 98.80 | 1.00 | 0.20 |
| ZF | 98.00 | 1.60 | 0.40 |
| ZJ | 96.40 | 2.90 | 0.70 |
| ZL | 95.60 | 3.50 | 0.90 |
| ZR | 93.20 | 5.40 | 1.40 |
| ZT | 92.40 | 6.00 | 1.60 |
| ZX | 90.80 | 7.40 | 1.80 |
| ZE | 99.60 | 0.30 | 0.00 |
| ZG | 98.80 | 0.80 | 0.20 |
| ZH | 95.00 | 0.60 | 0.40 |
| ZI | 97.20 | 3.00 | 0.60 |
| ZK | 96.40 | 2.90 | 0.20 |
| ZM | 95.60 | 3.50 | 0.80 |
| ZN | 94.00 | 4.80 | 0.20 |
| ZO | 92.40 | 2.00 | 1.60 |
| ZP | 90.80 | 5.00 | 2.00 |

The invention polymers contain at least two different polymer populations, each with a different (if not very different) molecular weight (MW) and weight distribution (MWD). The specific MW and MWD for each population correlates to the amount of hydrogen and α,ω-diene added to the stage that created that population. The overall polymer composition also depends on each stage's relative reaction time.

Polymer embodiments have weight average molecular weights as shown in Table 9. It should be appreciated that ranges formed by any combination of these limits are within the scope of this invention. Some useful invention polymer embodiments have weight average molecular weights that fall within the following ranges: 30,000–750,000; 30,000–1,000,000; 30,000–2,000,000; 70,000–750,000; 70,000–1,000,000; 70,000–2,000,000; 100,000–750,000; 100,000–1,000,000; and 100,000–2,000,000.

TABLE 9

Exemplary polymer embodiment weight average molecular weight.

| Embodiment | Weight average molecular weight |
|---|---|
| ZO | <2,000,000 |
| ZQ | <1,000,000 |
| ZR | <750,000 |
| ZS | >100,000 |
| ZT | >70,000 |
| ZU | >30,000 |

The polymer may have an MFR as shown in Table 10. MFR is determined according to ASTM D-1238, condition L (2.16 kg, 230° C.). It should be appreciated that ranges formed by any combination of these limits are within the scope of this invention. Some invention polymers have MFRs in the following ranges: 0.1–5, 0.1–8, 0.1–10, 0.1–15, 0.5–5, 0.5–8, 0.5–10, 0.5–15, 1–5, 1–8, 1–10, and 1–15 dg/min.

TABLE 10

Exemplary polymer melt flow rates.

| Embodiment | MFR, in dg/min |
|---|---|
| ZV | ≦19 |
| ZX | ≦10 |
| ZY | ≦15 |
| KK | ≦5 |
| KL | ≦8 |
| KA | ≧1.0 |
| KD | ≧0.5 |
| KE | ≧0.1 |

Polymer embodiments may have melting points that are less than 165° C., and some embodiments less than 160° C. Upper limits for melting point depend on the specific application, but would typically not be higher than 165° C.

The polymer may include blends, including reactor blends of α-olefins and particularly homopolymers and blends, including reactor blends of polypropylene and particularly metallocene-catalyzed polypropylene.

The invention polymers may be blended with other polymers, particularly with other polyolefins. Specific examples of such polyolefins include, but are not limited to ethylene-propylene rubber, ethylene-propylene-diene rubber, dynamically vulcanized alloys, adhesive compositions and ethylene plastomers. Specific examples of commercially available ethylene plastomers include EXACT™ resins products of ExxonMobil Chemical Company and, AFFINITY™ resins and ENGAGE™ resins, products of Dow Chemical Company.

The invention polymers may be employed in a wide variety of applications, for example, manufacturing films, fibers, such as spunbonded and melt blown fibers, fabrics, such as nonwoven fabrics, and molded articles, and as blend components (also known as modifiers). More particularly, these articles include, for example, cast films, oriented films, injection-molded articles, blow-molded articles, foamed articles, and thermoformed articles.

The propylene/α,ω-diene polymers produced by this invention's methods are generally suitable for thermoforming, blow molding, foaming, and making fibers, fabrics and films. Specific examples of these applications include thermoformed articles, dairy containers, biaxial-oriented films, and insulation materials. Examples of other methods and applications for making and using polypropylene are described in the *Encyclopedia of Chemical Technology*, by Kirk-Othmer, Fourth Edition, Vol. 17, at pages 750–756; 776–789; 803–809; and 817–819. Examples of other applications for which foamed plastics, such as foamed polypropylene, are useful may be found in *Encyclopedia of Chemical Technology*, by Kirk-Othmer, Fourth Edition, Vol. 11, at pages 730–783.

In the case of propylene random copolymers (RCP), such as propylene/ethylene, diene incorporation during polymerization may produce RCP resins suitable in applications such as films and injection molded medical devices. Specific examples of these applications include syringes, pill-bottles, and cast film for packaging and containers, and films for low temperature uses.

EXAMPLES

General

Polymerization was conducted in either a two-liter autoclave reactor or a series of two 150 gallon stirred tanks, auto refrigerated boiling liquid reactor. Monomer feed and catalyst preparation for each were similar. Polymerization grade propylene was purified by passing first through basic alumina activated at 600° C., followed by molecular sieves activated at 600° C. 1,9-decadiene (96%) was purchased from Aldrich-Sigma Bulk Chemicals and was used as received.

Molecular weight of the polymers was analyzed by GPC using Waters 150C high temperature system with a DRI detector and Showdex AT-806MS column. Melting and crystallization temperatures of the polymers were measured on a TA Instrument DSC-912 using a heating and cooling rate of 10° C./min. The melting temperatures reported were obtained from the second melt.

Catalyst Preparation

All catalyst preparations were performed in an inert atmosphere with <1.5 ppm $H_2O$ content. The metallocenes were obtained from internal sources. The silica support, "Davison 952", was purchased from Grace Davison Inc., and calcined at 600° C. under a dry nitrogen flow for 8–24 hours to achieve a hydroxyl content of 0.8 to 1.2 mmol/g silica.

In a nitrogen-purged dry glove box, the calcined silica (394.32 g) was weighed and placed in a 3-neck, 4-L reactor that was fitted with an overhead stirrer. Dry toluene, 2 L, was added and the mixture was stirred vigorously. N,N-diethylaniline (27.6 ml, 0.174 mole) was added using a syringe. Tris(perfluorophenyl)boron (85.96 g, 0.168 mole) was added as a solid. The above mixture was stirred for 1 hour. The metallocene, dimethylsilylbis(2-methyl-4-phenyl indenyl)zirconium dimethyl (5.99 g, 0.0102 mole) was added and the reaction mixture was stirred for an additional 2 hours. The solvent was decanted off, and the solid was dried under vacuum overnight. Metallocene loading was found to be 0.02 mmol of transition metal per gram of catalyst A.

EXAMPLES

Example 1

A 2-liter autoclave reactor was charged with triethylaluminum (1.0 mL of 1M solution in hexane), hydrogen (6.9 mmol), and propylene (800 mL). While the contents of the reactor were stirred at 500 rpm, catalyst A (50 mg) was injected with propylene (200 mL). The reactor was heated to 70° C. After 60 min, the reactor was cooled to 40° C., and 1,9-decadiene (0.2 mL) was added to the reactor. The reactor was heated back to 70° C., and polymerization continued for another 60 min. The reactor was cooled to 25° C., and the propylene was vented. The polymer was collected and dried in air for 12 hours (yield: 113.2 g).

Example 2

A 2-liter autoclave reactor was charged with triethylaluminum (1.0 mL of 1M solution in hexane), hydrogen (6.9 mmol), and propylene (800 mL). While the contents of the reactor were stirred at 500 rpm, catalyst A (50 mg) was injected with propylene (200 mL). The reactor was heated to 70° C. After 90 min, the reactor was cooled to 40° C., and 1,9-decadiene (0.2 mL) was added to the reactor. The reactor was heated back to 70° C., and polymerization continued for another 30 min. Then the reactor was cooled to 25° C. and the propylene was vented. The polymer was collected and dried in air for 12 hours (yield: 151.1 g).

Example 3

A 2-liter autoclave reactor was charged with triethylaluminum (1.0 mL of 1M solution in hexane), hydrogen (6.9 mmol), and propylene (800 mL). While the contents of the reactor were stirred at 500 rpm, catalyst A (50 mg) was injected with propylene (200 mL). The reactor was heated to 70° C. After 30 min, the reactor was cooled to 40° C., and 1,9-decadiene (0.2 mL) was added to the reactor. The reactor was heated back to 70° C., and polymerization continued for another 90 min. Then the reactor was cooled to 25° C. and the propylene was vented. The polymer was collected and dried in air for 12 hours (yield: 102.1 g).

Example 4

A 2-liter autoclave reactor was charged with triethylaluminum (1.0 mL of 1M solution in hexane), hydrogen (6.9 mmol), and propylene (800 mL). While the contents of the reactor were stirred at 500 rpm, catalyst A (50 mg) was injected with propylene (200 mL). The reactor was heated to 70° C. After 60 min, the reactor was cooled to 40° C., and 1,9-decadiene (0.2 mL) and hydrogen (13.8 mmol) were added to the reactor. The reactor was heated back to 70° C., and polymerization continued for another 60 min. Then the reactor was cooled to 25° C., and the propylene was vented. The polymer was collected and dried in air for 12 hours (yield: 166.6 g).

Example 5

The polymerization was carried out in the same manner as in Example 4 (yield: 224 g).

Example 6

The polymerization was carried out in the same manner as in Example 4, except that 40 mg of catalyst A was used (yield: 154 g).

Example 7

The polymerization was carried out in the same manner as in Example 4, except that 13.8 mmol of hydrogen was used in the first polymerization stage, and 27.6 mmol of hydrogen was used in the second polymerization stage (yield: 157.1 g).

Example 8

The polymerization was carried out in the same manner as in Example 7, except that 40 mg of catalyst A was used (yield: 174 g).

Example 9

The polymerization was carried out in the same manner as in Example 8 (yield: 124 g).

Example 10

The polymerization was carried out in the same manner as in Example 4, except that no hydrogen was used in the first stage, and 34.5 mmol of hydrogen was used in the second stage (yield: 70.8 g)

Comparative Example 1

A 2-liter autoclave reactor was charged with triethylaluminum (1.0 mL of 1M solution in hexane), hydrogen (6.9 mmol), and propylene (800 mL). While the contents of the reactor were stirred at 500 rpm, catalyst A (50 mg) was injected with propylene (200 mL). The reactor was heated to 70° C. After 60 min, the reactor was cooled to 25° C., and the propylene was vented. The polymer was collected and dried in air for 12 hours (yield: 61.3 g).

Comparative Example 2

A 2-liter autoclave reactor was charged with triethylaluminum (1.0 mL of 1M solution in hexane), hydrogen (6.9 mmol), 1,9-decadiene (0.2 mL), and propylene (800 mL). While the contents of the reactor were stirred at 500 rpm, catalyst A (50 mg) was injected with propylene (200 mL). The reactor was heated to 70° C. After 120 min, the reactor was cooled to 25° C. and the propylene was vented. The polymer was collected and dried in air for 12 hours (yield: 130 g).

Some polymerization parameters and characterization data are listed in the Table.

TABLE 11

| Sample | Example 1 | Example 2 | Example 3 | Example 4 | Example 5 | Example 6 |
|---|---|---|---|---|---|---|
| Temp (° C.) | 70 | 70 | 70 | 70 | 70 | 70 |
| C3 (mL) | 1000 | 1000 | 1000 | 1000 | 1000 | 1000 |
| Catalyst (mg) | 50 | 50 | 50 | 50 | 50 | 40 |
| Stage ONE: | | | | | | |
| 1,9-DD (ppm) | 0 | 0 | 0 | 0 | 0 | 0 |
| H2 (mmol) | 6.9 | 6.9 | 6.9 | 6.9 | 6.9 | 6.9 |
| Run time (min) | 60 | 90 | 30 | 60 | 60 | 60 |
| Stage TWO: | | | | | | |
| 1,9-DD (ppm) | 200 | 200 | 200 | 200 | 200 | 200 |
| H2 (mmol) | 0.0 | 0.0 | 0.0 | 13.8 | 13.8 | 13.8 |
| Run time (min) | 60 | 30 | 90 | 60 | 60 | 60 |
| Yield (g) | 113.2 | 151.1 | 102.1 | 166.6 | 224 | 154 |
| GPC | | | | | | |
| Mn | 146,646 | 140,871 | 137,164 | 95,605 | 109,369 | 91,668 |
| Mw | 331,273 | 317,265 | 345,530 | 251,444 | 245,045 | 215,203 |
| MWD | 2.26 | 2.25 | 2.52 | 2.63 | 2.24 | 2.35 |
| Mz | 691,623 | 591,941 | 764,734 | 480,205 | 424,068 | 385,212 |
| Mz/Mw | 2.09 | 1.87 | 2.21 | 1.91 | 1.73 | 1.79 |
| Mz + 1 | 1,162,622 | 980,308 | 1,260,084 | 744,661 | 641,790 | 595,268 |
| Mz + 1/Mw | 3.51 | 3.09 | 3.65 | 2.96 | 2.62 | 2.77 |
| DSC | | | | | | |
| Melt (° C.) | 148.3 | 148.8 | 149.2 | 151.7 | | |
| Recrystal. (° C.) | 104.1 | 105.2 | 104.1 | 106.6 | | |

| Sample | Example 7 | Example 8 | Example 9 | Example 10 | Example A (comp.) | Example B (comp.) |
|---|---|---|---|---|---|---|
| Temp (° C.) | 70 | 70 | 70 | 70 | 70 | 70 |
| C3 (mL) | 1000 | 1000 | 1000 | 1000 | 1000 | 1000 |
| Catalyst (mg) | 50 | 40 | 40 | 50 | 50 | 50 |
| Stage ONE: | | | | | | |
| 1,9-DD (ppm) | 0 | 0 | 0 | 0 | 0 | 200 |
| H2 (mmol) | 13.8 | 13.8 | 13.8 | 0.0 | 6.9 | 6.9 |
| Run time (min) | 60 | 60 | 60 | 60 | 60 | 120 |
| Stage TWO: | | | | | | |
| 1,9-DD (ppm) | 200 | 200 | 200 | 300 | N/A | N/A |
| H2 (mmol) | 27.6 | 27.6 | 27.6 | 34.5 | N/A | N/A |
| Run time (min) | 60 | 60 | 60 | 60 | N/A | N/A |
| Yield (g) | 157.1 | 174 | 124 | 70.8 | 61.3 | 130 |
| GPC | | | | | | |
| Mn | 53,815 | 43,019 | 33,526 | 17,992 | 117,869 | 128,136 |
| Mw | 144,230 | 126,505 | 113,607 | 99,904 | 226,471 | 366,525 |
| MWD | 2.68 | 2.94 | 3.39 | 5.55 | 1.92 | 2.86 |
| Mz | 246,844 | 217,413 | 194,585 | 574,680 | 375,535 | 836,545 |
| Mz/Mw | 1.71 | 1.72 | 1.71 | 5.75 | 1.66 | 2.28 |
| Mz + 1 | 360,441 | 317,997 | 282,415 | 1,380,610 | 567,103 | 1,350,723 |
| Mz + 1/Mw | 2.50 | 2.51 | 2.49 | 13.82 | 2.5 | 3.69 |
| DSC | | | | | | |
| Melt (° C.) | 152.3 | | | 149.8 | 149.1 | 149.4 |
| Recrystal. (° C.) | 110.3 | | | 110.8 | 104.9 | 106.6 |

Examples 11, 12, and 13

Polymerizations were conducted in a pilot scale, two reactor, continuous, stirred tank, bulk liquid-phase process. The reactors were equipped with jackets for removing the heat of polymerization. It was attempted to maintain uniform conditions in the lead reactor over the course of these Example experiments. Reactor temperatures were set at 165° F. (74° C.) in the first (or lead) reactor and 155° F. (69° C.) in the second (or tail) reactor. Catalyst A, from a sealed-up preparation scheme but of similar recipe as described earlier, was fed as a 20% slurry in mineral oil. The catalyst-in-oil slurry was fed to the lead reactor with propylene. TEAL (2 wt % in hexane) was used as scavenger. Reactor pressures were about 470 psig in the lead reactor and about 420 psig in the tail reactor. Propylene monomer was fed to the lead reactor at a rate of 175 lb/hr (80 kg/hr) and to the tail reactor at a rate of 95 lb/hr (43 kg/hr). 1–9 decadiene monomer was fed to the tail reactor only. Hydrogen was added individually to both lead and tail reactors for molecular weight control. Reactor residence times were about 2.5 hr. in the lead reactor and about 2.1 hr. in the tail reactor. It was attempted to maintain uniform conditions in the lead reactor over the course of these Example experiments. Polymer was discharged from the reactor series as a granular product.

Specific reactor conditions pertaining to the different examples are shown in the Table below.

TABLE 12

Pilot Line Reactor Polymerizations

| | EXAMPLES | | |
|---|---|---|---|
| | 11C | 12 | 13 |
| Catalyst Feed Rate (g/hr) | 2.1 | 2.8 | 3.5 |
| TEAL Feed Rate (ml/min) | 4.6 | 4.6 | 7.4 |
| $H_2$ gas concn in lead reactor (molar ppm) | 904 | 832 | 833 |
| $H_2$ gas concn in tail reactor (mppm) | 1761 | 2402 | 4079 |
| Diene flow* to tail reactor (weight ppm) | 0 | 50 | 200 |
| Lead reactor production (lb/hr) | 48.3 | 53.7 | 61.76 |
| Tail reactor production (lb/hr) | 32.8 | 22.4 | 27.5 |
| MFR on final granules (dg/min) | 1.6 | 2.0 | 3.7 |

*based on total propylene feed to both reactors

The individual products from Examples 11 through 13 were melt homogenized and pelletized using a ZSK 20 (Werner & Pfleiderer) 8 min screw extruder. A stabilizer package involving 500 ppm Irganox™ 1076 and 1000 ppm Irgafox™ 168 (both from Ciba-Geigy Co.) was used. Note that Example 11, containing no diene is a control or comparative Example.

Testing of these products included molecular weight determinations via gel permeation chromatography (GPC), extensional viscosity measurements using a Rheometric Melt Elongational Rheometer and observations of blown film (done on laboratory blown film line) to determine the presence of gels. Blown film (~1 mil thick) is particularly sensitive to the presence of gels, which are observed as undispersed particles in the film.

A breakdown of the molecular weight data of the final products in terms of the individual contributions of the linear (from lead reactor, where no diene was present) and branched (from tail reactor, where diene was present) components for Examples 12 and 13 are shown in the Table below. The determination involves deconvoluting the final-product GPC data, knowing the lead reactor (linear polymer) GPC molecular weights and the production split between the two reactors. Molecular weight plots of the component contributions for Examples 12 and 13 are shown in FIGS. 2 and 3 respectively.

TABLE 13

Molecular Weights of Linear and Branched Components of Product Examples 12 and 13

| | EXAMPLES | |
|---|---|---|
| | 12 | 13 |
| Diene Conc. (ppm) | 50 | 200 |
| Lead reactor Product (linear) | | |
| $M_w$ | 147431 | 147431 |
| $M_w$ | 307688 | 307688 |
| $M_z$ | 532082 | 532082 |

TABLE 13-continued

Molecular Weights of Linear and Branched Components of Product Examples 12 and 13

| | EXAMPLES | |
|---|---|---|
| | 12 | 13 |
| Tail reactor product (branched) | | |
| $M_w$ | 134410 | 88068 |
| $M_w$ | 275574 | 247366 |
| $M_z$ | 470274 | 461056 |

FIGS. 2 and 3, the molecular weight plots of the product components made in the tail reactor (where diene was present), show no indications of high molecular-weight, highly branched species. In both plots, the high-molecular-weight end of the tail reactor products is well below that of the corresponding linear lead reactor product. This suggests an absence of gels in the final products.

Indeed, blown films of product Examples 12 and 13 showed no indications of any gels or undispersed particles, over and beyond the level of Examples 11. Example 11, with no added diene, represents a no-gel benchmark.

TABLE 14

Gel Observations on Blown Films*

| | EXAMPLES | | |
|---|---|---|---|
| | 11 | 12 | 13 |
| Film Thickness (mil) | 1.1 | 1.1 | 1.05 |
| Film Layflat (in) | 3.0 | 2.9 | 2.6 |
| Gel ranking | No gels | No gels | No gels |

*Blowing conditions maintained for all products

Examples 11, 12, and 13 were analyzed in an extensional strain mode using a Rheometric Melt Elongational Rheometer (RME). The polymers were molded into rectangular specimens (60×8×2 mm), which were then set in clamps 50 mm apart. Measurements were performed at 180° C. Background information on the rheometer and the principles involved in the measurement can be found in an article by J. Meissner and J. Hostettler titled "A New Elongational Rheometer for Polymer Melts and Other Highly Viscoelastic Liquids" (*Rheol. Acta*, Vol. 33, pp. 1–21, 1994)

A key piece of information derived from extensional viscosity measurements is whether a sample displays strain-hardening behavior. The phenomenon of strain hardening corresponds to an abrupt up-swing of the elongational viscosity. Typically, strain hardening is defined as the ratio of the extensional viscosity of a polymer at break to the linear viscosity being >1 m at a given strain rate.

This phenomenon, historically reported in the late 1960's for high pressure polymerized LDPE, is generally thought to indicate the presence of long chain branched species.

FIGS. 4, 5, and 6 show extensional viscosity growth curves for Product Examples 11, 12, and 13 respectively. From the figures, the linear control polymer (Example 11, no diene) does not show any indication of strain hardening and behaves similar to a linear viscoelastic material. In contrast, Examples 12 and 13 (both containing diene) show definitive strain-hardening behavior. This observation reflects the different molecular architecture of the inventive Examples 12 and 13.

In review, the polymerization process outlined above provides access to novel products having desirable property profiles. One such desirable combination is the attainment of strain-hardening behavior without any gels, and easy processing in typical thermoplastic fabricating operations. This property combination is difficult to achieve, but offers advantages in applications such as films, extrusion coatings, foams, and thermoformed and molded parts.

While particular embodiments have been used to define and illustrate this invention, it will be appreciated by those of ordinary skill in the art that the invention lends itself to many different variations not explicitly illustrated in this document. For these reasons, the claims define the invention's scope.

All cited documents are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

Certain features of the present invention are described in terms of a set of numerical upper limits and a set of numerical lower limits. It should be appreciated that ranges formed by any combination of these limits are within the scope of the invention unless otherwise indicated.

The invention claimed is:

1. A propylene/diene copolymerization method comprising:
   (a) conducting a diene-free, ethene free polymerization step in the presence of a polymerization catalyst, an amount of propylene monomer, and optionally, an amount of hydrogen and/or other olefin monomer(s) under polymerization conditions comprising reaction temperature, pressure and time ($t_1$); and then
   (b) thereafter conducting a diene-incorporation polymerization step comprising combining the product of step (a), an amount of α,ω-diene selected from the group consisting of 1,4-pentadiene, 1,5-hexadiene, 1,6-heptadiene, 1,7-octadiene, 1,8 nonadiene, 1,9-decadiene, 1,10-undecadiene, 1,11-dodecadiene, 3,4-dimethyl-1, 6-heptadiene, 4-ethyl-1,7-octadiene, and 3-ethyl-4-methyl-5-propyl-1,10-undecadiene, an amount of hydrogen, and optionally, an amount of other olefin monomer(s) excepting ethene under polymerization conditions comprising reaction temperature, pressure and time ($t_2$);
   wherein the polymerization conditions in the diene-free polymerization step yield substantially linear polymer and the polymerization conditions in the diene-incorporation step yield branched copolymer.

2. The method of claim 1 wherein the diene-free polymerization step reaction temperature ranges from 0 to 150° C.

3. The method of claim 1 wherein the diene-free polymerization step reaction temperature ranges from 50 to 80° C.

4. The method of claim 1 wherein the diene-incorporation polymerization step reaction temperature ranges from 0 to 150° C.

5. The method of claim 1 wherein the diene-incorporation polymerization step reaction temperature ranges from 50 to 80° C.

6. The method of claim 1 wherein the diene-free polymerization step reaction pressure ranges from 100 to 700 psia.

7. The method of claim 1 wherein the diene-incorporation polymerization step reaction pressure ranges from 100 to 700 psia.

8. The method of claim 1 wherein the diene-free polymerization step reaction time ($t_1$) and the diene-incorporation polymerization step reaction time ($t_2$) ranges from 30 to 180 minutes.

9. The method of claim 1 wherein $t_1$ divided by $t_2$ ranges from 0.3 to 3.

10. The method of claim 1 wherein $t_1$ divided by $t_2$ ranges from 0.5 to 2.

11. The method of claim 1 wherein the amount of propylene monomer ranges from 90 to 99.999 wt%.

12. The method of claim 1 wherein the other olefin monomer(s) are at least one of propene, 1-butene, 1-pentene, 1-hexene, 1-heptene, 1-octene, 1-nonene, 1-decene, 1-undecene, 1-dodecene, 4-methyl-1-pentene, 3-ethyl-1-hexene, 4-methyl-4-ethyl-1-hexene, 3-ethyl-5-methyl-1-heptene, 3-methyl-1-decene, 3,9-dimethyl -5-butyl-1-decene, or 4-methyl-1-undecene.

13. The method of claim 1 wherein the amount of other olefin monomer(s) in the diene-free polymerization step ranges from 0 to 8 wt%.

14. The method of claim 1 wherein the amount of other olefin monomer(s) in the diene-free polymerization step ranges from 0.001 to 8 wt%.

15. The method of claim 1 wherein the amount of other olefin monomer(s) in the diene-free polymerization step ranges from 0.005 to 3 wt%.

16. The method of claim 1 wherein the amount of other olefin monomer(s) in the diene-incorporation polymerization step ranges from 0 to 8 wt%.

17. The method of claim 1 wherein the amount of other olefin monomer(s) in the diene-incorporation polymerization step ranges from 0.001 to 8 wt%.

18. The method of claim 1 wherein the amount of other olefin monomer(s) in the diene-incorporation polymerization step ranges from 0.005 to 3 wt%.

19. The method of claim 1 wherein the amount of the α,ω-diene in the diene-incorporation polymerization step ranges from 0.001 to 2 wt%.

20. The method of claim 1 wherein the amount of the α,ω-diene in the diene-incorporation polymerization step ranges from 0.003 to 1.5 wt%.

21. The method of claim 1 wherein the amount of the α,ω-diene in the diene-incorporation polymerization step ranges from 0.005 to 1 wt%.

22. The method of claim 1 wherein the amount of hydrogen in the diene-free polymerization step ranges from 0 to 50,000 ppm.

23. The method of claim 1 wherein the amount of hydrogen in the diene-free polymerization step ranges from 0 to 20,000 ppm.

24. The method of claim 1 wherein the amount of hydrogen in the diene-free polymerization step ranges from 0 to 10,000 ppm.

25. The method of claim 1 wherein the amount of hydrogen in the diene-free polymerization step equals 0 ppm.

26. The method of claim 1 wherein the amount of hydrogen in the diene-incorporation polymerization step ranges from 100 to 50,000 ppm.

27. The method of claim 1 wherein the amount of hydrogen in the diene-incorporation polymerization step ranges from 500 to 20,000 ppm.

28. The method of claim 1 wherein the amount of hydrogen in the diene-incorporation polymerization step ranges from 1000 to 10,000 ppm.

29. The method of claim 1 wherein the polymerization catalyst is metallocene catalyst.

30. The method of claim 29 wherein the metallocene catalyst comprises Zr.

31. The method of claim 1 wherein
    (a) the diene-free polymerization step comprises
        (i) an amount of propylene monomer ranging from 90 to 99.999 wt%;
        (ii) an amount of hydrogen ranging from 100 to 50,000 ppm;
        (iii) an optional amount of other olefin monomer(s) ranging from 0.001 to 8 wt%, wherein said other olefins monomer(s) is one or more of 1-butene, 1-pentene, 1-hexene, 1-heptene, 1-octene, 1-nonene, 1-decene, 1-undecene, 1-dodecene, 4-methyl-1-pentene, 3-ethyl-1-hexene, 4-methyl-4-ethyl-1-hexene, 3-ethyl-5-methyl-1-heptene, 3-methyl-1-decene, 3,9-dimethyl-5-butyl-1-decene, or 4-methyl-1-undecene;
        (iv) a reaction temperature ranging from 0 to 150° C.;
        (v) a reaction pressure ranging from 100 to 700 psia;
        (vi) a reaction time ranging from 30 to 180 minutes; and
    (b) the diene-incorporation polymerization step comprises
        (i) the product of step (a);
        (ii) an amount of hydrogen ranging from 100 to 50,000 ppm;
        (iii) an optional amount of other olefin monomer(s) ranging from 0.001 to 8 wt%; wherein said other olefin monomer(s) is one or more of propene, 1-butene, 1-pentene, 1-hexene, 1-heptene, 1-octene, 1-nonene, 1-decene, 1-undecene, 1-dodecene, 4-methyl-1-pentene, 3-ethyl-1-hexene, 4-methyl-4-ethyl-1-hexene, 3-ethyl-5-methyl-1-heptene, 3-methyl-1-decene, 3,9-dimethyl-5-butyl-1-decene, or 4-methyl-1-undecene;
        (iv) an amount of α,ω-diene ranging from 0.001 to 2 wt%, wherein said α,ω-diene is one or more of 1,4-pentadiene, 1,5-hexadiene, 1,6-heptadiene, 1,7-octadiene, 1,8-nonadiene, 1,9-decadiene, 1,10-undecadiene, 1,11-dodecadiene, 3,4-dimethyl-1,6-heptadiene, 4-ethyl-1,7-octadiene or 3-ethyl-4-methyl-5-propyl-1,10-undecadiene;
        (v) a reaction temperature ranging from 0 to 150° C.;
        (vi) a reaction pressure ranging from 100 to 700 psia;
        (vii) a reaction time ranging from 30 to 180 minutes; and
    (c) the catalyst is a polymerization catalyst.

32. The method of claim 1 wherein the diene-free polymerization step and the diene-incorporation polymerization step comprises supplying an amount of at least one additional olefin monomer, excepting ethene.

33. A method of preparing an in-situ blend of linear and branched polyolefin(s) comprising:
    (a) supplying a single polymerization catalyst;
    (b) conducting a first polymerization step wherein the step comprises supplying an amount of propylene monomer, and optionally, an amount of hydrogen and or other olefin monomer(s), excepting ethene and diene, and contacting the polymerization catalyst, the propylene monomer, and optionally the hydrogen and/or other olefin monomer(s); and then
    (c) conducting at least one additional polymerization step wherein the additional step comprises supplying the product of the first polymerization step, an amount of α,ω-diene selected from the group consisting of 1,4-pentadiene, 1,5-hexadiene, 1,6-heptadiene, 1,7-octadiene, 1,8nonadiene, 1,9-decadiene, 1,10-undecadiene, 1,11-dodecadiene, 3,4-dimethyl-1,6-heptadiene, 4-ethyl-1,7-octadiene, and 3-ethyl-4-methyl-5-propyl-1,10-undecadiene, an amount of hydrogen and optionally, an amount of other olefin, excepting ethylene monomer(s);
    (d) controlling the ratio of α,ω-diene-to-hydrogen;
    (e) contacting the α,ω-diene, the hydrogen, the propylene monomer, the other olefin monomer(s) and the polymerization catalyst; and
    (f) obtaining a polymer blend comprising two different polymer populations.

34. A method of preparing an in-situ blend of linear and branched polyolefin(s) comprising:
    (a) supplying a single polymerization catalyst;
    (b) conducting a first polymerization step under supercritical propylene temperature and pressure wherein the step comprises supplying an amount of propylene monomer, and optionally, an amount of hydrogen and or other olefin monomer(s), excepting ethene, and contacting the polymerization catalyst, the propylene monomer, and optionally the hydrogen and/or other olefin monomer(s); and then
    (c) conducting at least one additional polymerization step wherein the additional step comprises supplying the product of the first polymerization step, an amount of α,ω-diene, an amount of hydrogen and optionally, an amount of other olefin, excepting ethylene monomer(s):
    (d) controlling the ratio of α,ω-diene-to-hydrogen;
    (e) contacting the α,ω-diene, the hydrogen, the propylene monomer, the other olefin monomer(s) and the polymerization catalyst; and
    (f) obtaining a polymer blend comprising two different polymer populations.

35. A method of preparing an in-situ blend of linear and branched polyolefin(s) comprising:
    (a) supplying a single polymerization catalyst;
    (b) conducting a first polymerization step wherein the step comprises supplying an amount of propylene monomer, and optionally, an amount of hydrogen and or other olefin monomer(s), excepting ethene, and contacting the polymerization catalyst, the propylene monomer, and optionally the hydrogen and/or other olefin monomer(s); and then
    (c) conducting at least one additional polymerization step under supercritical propylene temperature and pressure wherein the additional step comprises supplying the product of the first polymerization step, an amount of α,ω-diene, an amount of hydrogen and optionally, an amount of other olefin, excepting ethylene monomer(s);
    (d) controlling the ratio of α,ω-diene-to-hydrogen;
    (e) contacting the α,ω-diene, the hydrogen, the propylene monomer, the other olefin monomer(s) and the polymerization catalyst; and
    (f) obtaining a polymer blend comprising two different polymer populations.

36. The method of claim 1 wherein the diene-free polymerization step and the diene-incorporation polymerization step are performed in a slurry process.

37. The method of claim 1 wherein the diene-free polymerization step and the diene-incorporation polymerization step are run in single, series or parallel reactors.

38. The method of claim 1 wherein the amount of hydrogen is added during the diene-incorporation step to favor a lower molecular weight polymer.

39. The method of claims 34 or 35, wherein both the diene-free polymerization step and the diene-incorporation polymerization steps are conducted under supercritical temperature and pressure.

40. The method of claims 1, 34 or 35 wherein the polymerizations are performed in series reactors.

* * * * *